US009833974B2

(12) United States Patent
Kwon et al.

(10) Patent No.: US 9,833,974 B2
(45) Date of Patent: Dec. 5, 2017

(54) FLOORING MATERIAL AND FABRICATION METHOD THEREOF

(75) Inventors: Hyunjong Kwon, Ulsan (KR); Kyungtae Ha, Ulsan (KR); Gyeongmin Lee, Ulsan (KR)

(73) Assignee: LG HAUSYS, LTD, Seoul (KR)

( * ) Notice: Subject to any disclaimer, the term of this patent is extended or adjusted under 35 U.S.C. 154(b) by 1155 days.

(21) Appl. No.: 13/388,386

(22) PCT Filed: Aug. 26, 2010

(86) PCT No.: PCT/KR2010/005723
§ 371 (c)(1),
(2), (4) Date: Feb. 1, 2012

(87) PCT Pub. No.: WO2011/037325
PCT Pub. Date: Mar. 31, 2011

(65) Prior Publication Data

US 2012/0128946 A1 May 24, 2012

(30) Foreign Application Priority Data

Sep. 23, 2009 (KR) ........................ 10-2009-0090076

(51) Int. Cl.
*B32B 3/10* (2006.01)
*B32B 27/02* (2006.01)
(Continued)

(52) U.S. Cl.
CPC ................ *B32B 27/02* (2013.01); *B32B 5/02* (2013.01); *B32B 5/022* (2013.01); *B32B 5/024* (2013.01);
(Continued)

(58) Field of Classification Search
CPC .......................... Y10T 428/24994; B32B 5/02
See application file for complete search history.

(56) References Cited

U.S. PATENT DOCUMENTS 7,029,750 B2 * 4/2006 Takei ...................... C08F 14/26 428/323
2003/0124397 A1 * 7/2003 Kim .......................... B32B 5/18 428/301.4

(Continued)

FOREIGN PATENT DOCUMENTS

JP 10-140806 A 5/1998
JP 2003-27723 A 1/2003

(Continued)

OTHER PUBLICATIONS

Japanese Patent Application No. 2012-529654, Notice of Allowance dated Mar. 19, 2015, three (3) pages.

(Continued)

*Primary Examiner* — Christopher Polley
(74) *Attorney, Agent, or Firm* — Nath, Goldberg & Meyer; Joshua B. Goldberg; Christopher Thomas

(57) ABSTRACT

The present invention relates to a flooring material and a fabrication method thereof. Since the invention forms the flooring material using bio-degradable resin which can be fabricated with materials extracted from the reproducible resources, the invention solves the supply and demand problem of raw materials caused by the depletion of oil resources. Further, the invention improves the production efficiency of the flooring materials by applying a calendaring method during the fabrication process, emits few environmentally-harmful materials including $CO_2$ or the like, and provides the environmentally-friendly flooring material which is discarded easily. In addition, the invention can solve the problem caused by the size change which occurs when a bio-degradable sheet is used, whereby a stably and continuously-usable flooring material is provided.

18 Claims, 3 Drawing Sheets

1
22
21
11
31
32
33

(51) Int. Cl.

| | |
|---|---|
| ***B32B 5/02*** | (2006.01) |
| ***B32B 17/04*** | (2006.01) |
| ***B32B 27/04*** | (2006.01) |
| ***B32B 27/20*** | (2006.01) |
| ***B32B 27/22*** | (2006.01) |
| ***B32B 27/30*** | (2006.01) |
| ***B32B 27/36*** | (2006.01) |
| ***B32B 27/38*** | (2006.01) |
| ***B32B 27/40*** | (2006.01) |
| ***B32B 27/42*** | (2006.01) |
| *E04F 15/02* | (2006.01) |

(52) U.S. Cl.

CPC .............. *B32B 5/028* (2013.01); *B32B 17/04* (2013.01); *B32B 27/04* (2013.01); *B32B 27/20* (2013.01); *B32B 27/22* (2013.01); *B32B 27/30* (2013.01); *B32B 27/36* (2013.01); *B32B 27/38* (2013.01); *B32B 27/40* (2013.01); *B32B 27/42* (2013.01); *B32B 2262/0246* (2013.01); *B32B 2262/0253* (2013.01); *B32B 2262/0261* (2013.01); *B32B 2262/0276* (2013.01); *B32B 2262/0292* (2013.01); *B32B 2262/04* (2013.01); *B32B 2262/101* (2013.01); *B32B 2262/106* (2013.01); *B32B 2307/7163* (2013.01); *B32B 2419/00* (2013.01); *E04F 15/02* (2013.01); *Y10T 428/24802* (2015.01); *Y10T 428/24994* (2015.04); *Y10T 428/249924* (2015.04); *Y10T 442/10* (2015.04); *Y10T 442/20* (2015.04); *Y10T 442/30* (2015.04); *Y10T 442/60* (2015.04)

(56) References Cited

U.S. PATENT DOCUMENTS

| | | | | |
|---|---|---|---|---|
| 2005/0123744 | A1* | 6/2005 | Mohanty ................. | B29C 67/24 428/331 |
| 2005/0136259 | A1 | 6/2005 | Mohanty et al. | |
| 2009/0218030 | A1* | 9/2009 | LaVietes ................. | B32B 27/12 156/71 |
| 2010/0015420 | A1* | 1/2010 | Riebel ..................... | B32B 27/06 428/203 |

FOREIGN PATENT DOCUMENTS

| | | | |
|---|---|---|---|
| JP | 2004-107413 | A | 4/2004 |
| JP | 2004-351628 | A | 12/2004 |
| JP | 2007284587 | A | 11/2007 |
| JP | 2008-8138 | A | 1/2008 |
| JP | 2008-75367 | A | 4/2008 |
| JP | 2008-81588 | A | 4/2008 |
| JP | 2008207535 | A | 9/2008 |
| JP | 2008-239857 | A | 10/2008 |
| JP | 2010540750 | A | 12/2010 |
| KR | 10-2008-0092588 | A | 10/2008 |
| WO | 2009/045564 | A1 | 4/2009 |

OTHER PUBLICATIONS

Japanese Patent Application No. 2012-529654, Official Action dated Jun. 5, 2014, three (3) pages.

* cited by examiner

【Fig 1】
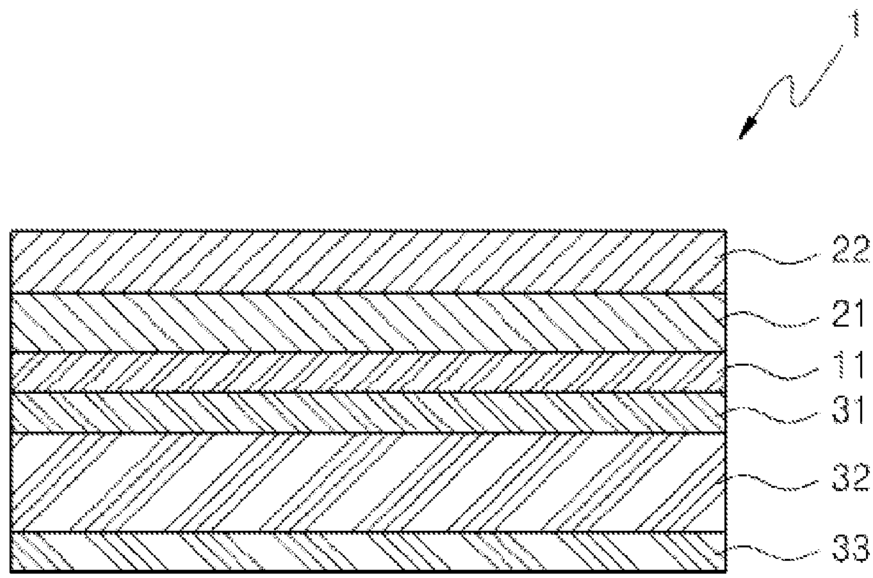
【Fig 2】
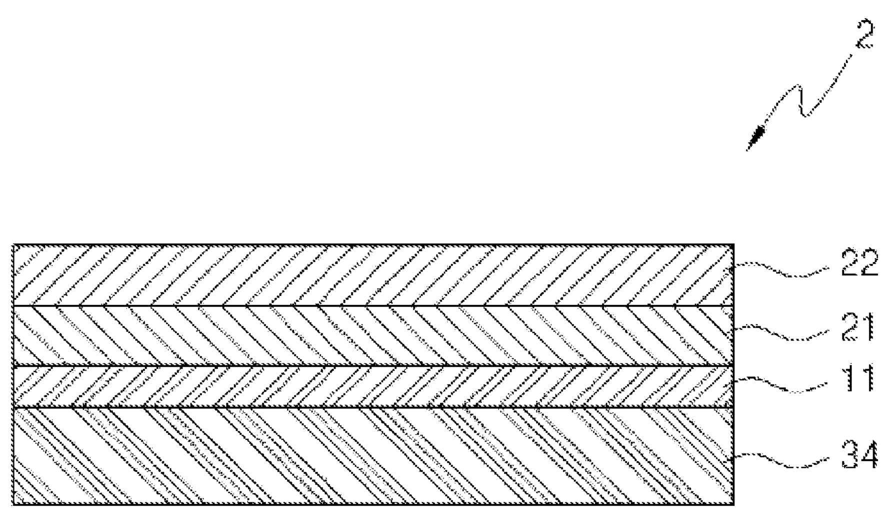

【Fig 3】
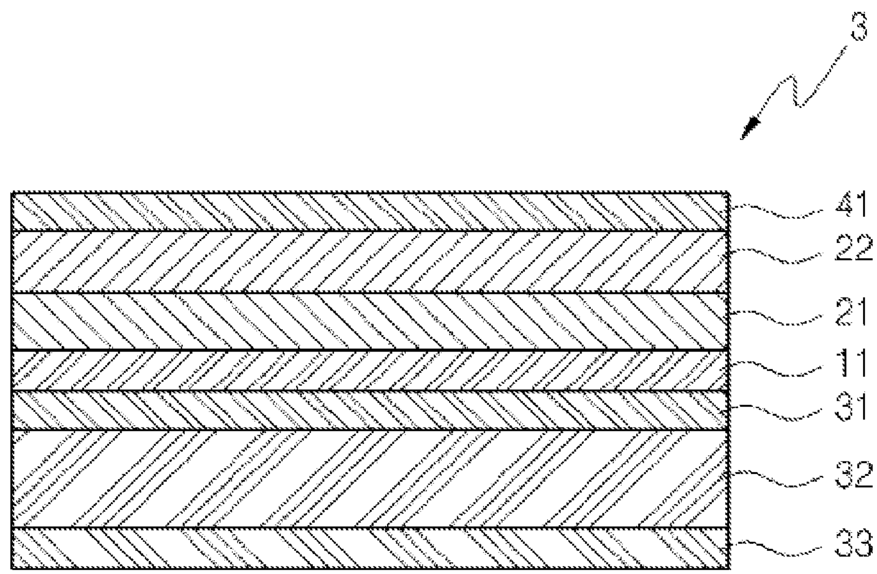
【Fig 4】
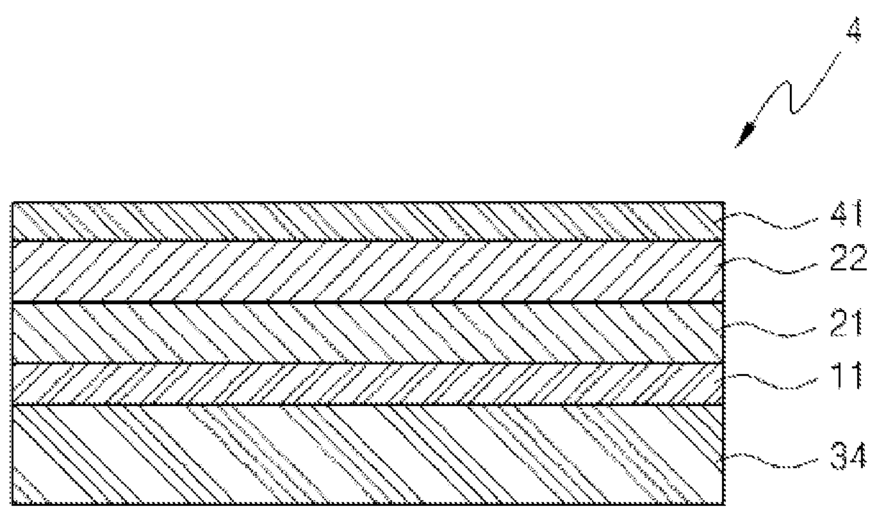

【Fig 5】
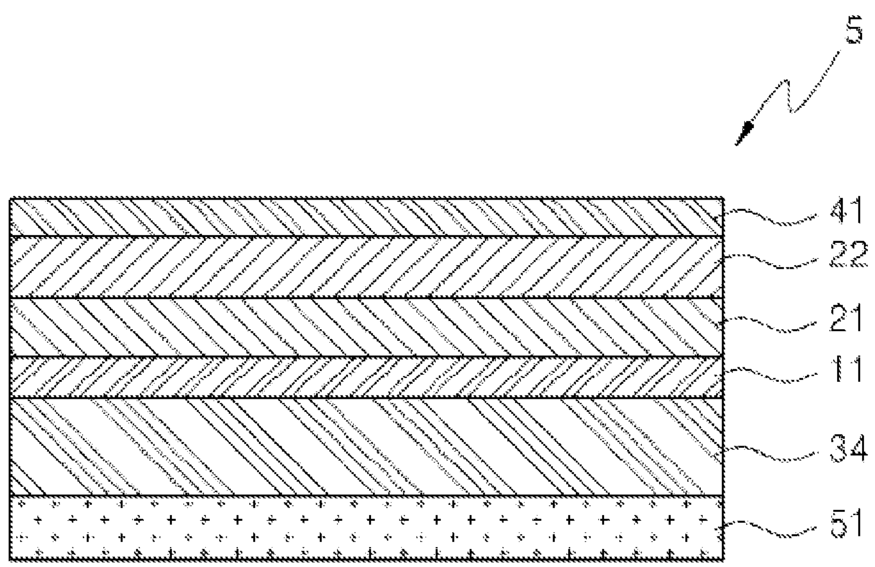

FLOORING MATERIAL AND FABRICATION METHOD THEREOF

This is a National Phase Application filed under 35 U.S.C. §371 as a national stage of PCT/KR2010/005723, filed on Aug. 26, 2010, an application claiming the benefit under 35 U.S.C. §119 of Korean Application No. 10-2009-0090076, filed on Sep. 23, 2009, the content of each of which is hereby incorporated by reference in their entirety.

TECHNICAL FIELD

The present invention relates to a flooring material and a fabrication method thereof.

BACKGROUND ART

Generally, flooring materials using petroleum derivative resins such as polyvinyl chloride (PVC) are widely used in buildings such as houses, apartments, offices, stores, etc.

Such flooring materials are fabricated by extruding or calendaring PVC or the like. However, since raw materials of the flooring materials are obtained from limited oil resources, it is expected that there will arise a difficulty in supply of the raw materials due to depletion of oil resources.

Further, considering increasing interest in environmental issues, PVC-based flooring materials have problems that they are likely to emit environmentally-harmful materials and have harmful effects on the environment upon disposal.

Accordingly, a method of fabricating flooring materials using reproducible resources such as bio-degradable resins, e.g., poly lactic acid, or the like (for example, U.S. Pat. No. 7,354,656 and so on) has been proposed. However, since bio-degradable resin has low thermal resistance and strength, it is difficult to apply a calendaring process thereto, thereby deteriorating production efficiency. In addition, when a flooring material is fabricated using a bio-degradable resin or the like, dimensional stability is reduced due to expansion or contraction caused by environmental factors such as ambient temperature fluctuation. That is, flooring materials made of the bio-degradable resin suffer from dimensional change due to difference in temperature or humidity and thus undergo frequent occurrence of phenomena wherein connection between flooring materials becomes wider due to contraction or the surface of the flooring material rises due to expansion, thereby making it difficult to guarantee continuous and stable use of the flooring materials.

DISCLOSURE

Technical Problem

The present invention provides a flooring material and a fabrication method thereof.

Technical Solution

In accordance with one aspect of the present invention, a flooring material includes: a fiber layer or a fiber-reinforced polymer (FRP) layer; and a surface layer or a rear surface layer formed on the fiber layer or FRP layer and having at least one bio-degradable sheet.

In accordance with another aspect of the present invention, a method of fabricating a flooring material includes: forming a fiber layer or a fiber-reinforced polymer (FRP) layer; and forming a bio-degradable sheet on the fiber or FRP layer.

Advantageous Effects

According to embodiments of the present invention, a flooring material may be formed using a bio-degradable resin which can be prepared using raw materials extracted from plant resources, thereby solving problems associated with depletion of oil resources. Further, the present invention may improve efficiency in fabrication of flooring materials through application of a calendaring process during the fabrication process, emit few environmentally harmful substances such as $CO_2$ or the like, and provide environmentally friendly and easily disposable flooring materials. In addition, the present invention may solve problems caused by size change which can occur due to use of a bio-degradable sheet, thereby providing a stable and continuously-usable flooring material.

DESCRIPTION OF DRAWINGS

FIGS. 1 to 5 are sectional views of flooring materials according to various embodiments of the present invention.

MODE FOR INVENTION

The present invention relates to a flooring material which includes a fiber layer or a fiber-reinforced polymer (FRP) layer; and a surface layer or a rear surface layer formed on the fiber layer or FRP layer and having at least one bio-degradable sheet.

Next, the flooring material according to the present invention will be described in detail.

The flooring material includes a fiber layer or FRP layer (which will also be referred to as a "size stabilizing layer"), which serves to secure dimensional stability of the flooring material. That is, if the flooring material consists only of a resinous tile or sheet that comprises a bio-degradable resin and processing aids, there is variation in contract or expansion behaviors according to external environmental factors, such as temperature change. Thus, the flooring material containing a bio-degradable resin has a problem in that, in use, connection between flooring materials becomes wider due to contraction, or the surface of the flooring material rises up due to expansion. On the contrary, in the present invention, the fiber layer or FRP layer is used as a size stabilizing layer to solve the problem described above.

A material for the fiber layer according to the invention is not specifically limited. For example, material for the fiber layer may be glass fiber, carbon fiber, polyester fiber, polyamide fiber, polyurethane fiber, acrylic fiber, polyolefin fiber, cellulose fiber, or combinations of two or more thereof, without being limited thereto. Preferably, the fiber layer may be glass fiber, but is not limited thereto.

In addition, the form of the fiber layer included in the flooring material is not specifically limited. For example, the form of the fiber layer may include woven fabric, nonwoven fabric or scrim of the aforementioned fibers, without being limited thereto. The woven fabric of the aforementioned fibers may be fabricated by a conventional weaving method. Further, the nonwoven fabric of the aforementioned fibers may be fabricated by, for example, application to a conventional paper-making process, a sol prepared by adding pulp and water-soluble binders such as polyvinyl alcohol (PVA) or the like to the aforementioned fiber.

The fiber layer according to the present invention may have a form of a scrim, for example. The term "scrim" used herein means a net-shaped sheet in which fiber constituting the fiber layer is woven into a net.

Herein, the term "size stabilizing layer" may be a fiber-reinforced polymer layer. The term 'fiber-reinforced polymer layer' means a composite layer which is formed by impregnating the fiber with a resin, followed by curing or semi-curing the same.

Herein, the size stabilizing layer may be woven fabric, nonwoven fabric, or scrim, which is impregnated with a resin composition including one or more of polylactic acid (PLA), acrylic resin, polyvinyl chloride (PVC), urethane resin, melamine resin, phenol resin, epoxy resin, and polyester resin.

The resin composition impregnated into the woven fabric, nonwoven fabric or scrim may be poly lactic acid, acrylic resin, PVC, or urethane resin, but is not limited thereto.

The kind of woven fabric, nonwoven fabric, or scrim which serves as the fiber-reinforced polymer layer is not specifically limited. For example, the kind of woven fabric, nonwoven fabric, or scrim for the fiber-reinforced polymer layer may be woven fabric, nonwoven fabric, or scrim of the same fiber as the aforementioned fiber for the fiber layer. Specifically, a nonwoven fabric of glass fiber may be used, but the present invention is not limited thereto.

The woven fabric, nonwoven fabric or scrim constituting the fiber-reinforced polymer layer may have a basis weight of 20 to 120 g/m$^2$, preferably 30 to 120 g/m$^2$. If the basis weight is less than 20 g/m$^2$, there is a risk of low reinforcement effects on dimensional stability, whereas if the basis weight exceeds 120 g/m$^2$, interlayer adhesive strength can be deteriorated.

The amount of the resinous component constituting the fiber-reinforced polymer layer is not specifically limited, and may be properly regulated in consideration of desired reinforcement effects on dimensional stability, desired interlayer adhesive strength, and the like.

The size stabilizing layer may have a thickness of 0.2 to 0.8 mm. If the thickness is less than 0.2 mm, the reinforcement effect on dimensional stability can be deteriorated, whereas if the thickness exceeds 0.8 mm, the overall thickness of the flooring material can become thicker. However, it should be understood that this thickness range of the size stabilizing layer is provided merely as an example and may be properly regulated depending upon: the kind of size stabilizing layer, i.e. the fiber layer or the fiber-reinforced polymer layer; the kind and shape of fiber constituting the size stabilizing layer; the kind of resinous component contained in the fiber, and the like.

The flooring material according to the present invention includes the surface or rear surface layer formed on the fiber layer or FRP layer and having at least one bio-degradable sheet.

As used herein, the expressions 'B formed on A'; 'B formed on an upper or lower portion of A'; 'B formed on one side of A', and the like, may include all of the cases where B is directly attached to the surface of A, B is attached to the surface of A via a bonding agent or pressure-sensitive adhesive, and a separate layer is interposed between A and B, directly or via a bonding agent or pressure-sensitive adhesive.

Herein, the term "bio-degradable sheet" refers to a sheet or film type member which is formed using a resin composition including a bio-degradable resin. The bio-degradable sheet includes a sheet or film type foam or non-foam which is formed using such a resin composition. If needed, the sheet or film type member may be partially or entirely subjected to an embossing process.

Further, the bio-degradable sheet may be a calendaring sheet which is fabricated through a calendaring process. The calendaring sheet may have improved physical properties, such as durability, weather resistance, and surface strength, as compared with a sheet fabricated by other fabrication methods such as extrusion, pressing, etc.

In the present invention, the resin composition constituting the bio-degradable sheet includes a bio-degradable resin.

In this invention, the kind of bio-degradable resin is not specifically limited, and may be polylactic acid (PLA), for example. PLA is thermoplastic polyester of lactide or lactic acid and includes repeated units, as represented by Formula 1:

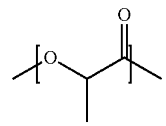

Since the polylactic acid may be prepared by polymerizing lactic acid derived from starch, which is extracted from reproducible plant resources such as corn, potatoes, sweet potatoes, etc., through bacterial fermentation, the polylactic acid can effectively cope with the problem of depletion of oil resources. In addition, the polylactic acid is environmentally friendly in that it emits much less environmentally-harmful substance, such as $CO_2$, upon use or disposal thereof, than that of the oil resources such as PVC and in that it can also be easily bio-deteriorated in a natural environment upon disposal.

The polylactic acid may be generally classified into D-polylactic acid, L-polylactic acid, D,L-polylactic acid, and meso-polylactic acid. According to this invention, the polylactic acid is not limited to the aforementioned kind, but may be used alone or in combination of two or more kinds thereof. Specifically, L-polylactic acid (PLLA) may be used in view of strength of the bio-degradable sheet. That is, according to the invention, the bio-degradable resin may be composed of single PLLA or a combination of PLLA and other bio-degradable resins. Here, if PLLA is combined with the other bio-degradable resins, the amount of PLLA may be 50 wt % or more, but is not limited thereto.

As described above, the polylactic acid may be prepared by polymerizing lactic acid or lactide. As needed, a suitable copolymer, including a glycol compound, such as ethylene glycol or propylene glycol; dicarboxylic acid, such as ethanedioic acid or terephthalic acid; hydroxycarbonic acid, such as glycolic acid or 2-hydroxybenzoic acid; or lactones, such as caprolactone or propiolactone, may be additionally copolymerized.

The resin composition constituting the bio-degradable sheet may include additional resins together with the aforementioned bio-degradable resin. In this case, the additional resin may be any resin that is compatible or miscible with the bio-degradable resin (i.e. resin with compatibility or miscibility with the bio-degradable resin). Herein, the term "compatibility" means properties, in which when two or more compositions (for example, resin compositions) are mixed, the compositions are uniformly mixed without interfacial separation between the compositions.

Generally, a resin having a certain polarity may exhibit excellent compatibility with the polylactic acid described above. In the present invention, any additional resin capable of being mixed with the polylactic acid may be used without being specifically limited so long as the resin has the properties as described above. Examples of the additional resin may include acrylic resin, polyvinyl chloride (PVC), poly(butyleneadipate-co-terephthalate) (PBAT), polyvinyl acetate (PVAc), polyethylene glycol (PEG), ionomer, polyglycolide, ethylenevinyl acetate, polycarbonate (PC), polycaprolactone, polyhydroxyalkanoate, polyester, polyolefin or an acrylic resin modified with a polar group such as maleic anhydride, epoxidized natural rubber and other epoxidized polymers, and combinations thereof. Specifically, the additional resin may be acrylic resin, polyvinyl chloride (PVC), poly(butylenesadipate-co-terephthalate) (PBAT), polyvinyl acetate (PVAc), polyethylene glycol (PEG), an ionomer, and the like, without being limited thereto.

In this invention, the amount of additional resin constituting the resin composition together with the polylactic acid is not specifically limited. However, when the resin is a petroleum-based resin, the amount of additional resin may be as low as possible. In one embodiment, the additional resin may be present in an amount of 70 parts by weight or less based on 100 parts by weight of the polylactic acid.

According to the present invention, the resin composition constituting the bio-degradable sheet may additionally contain one or more kinds of additives selected from processing aids, plasticizers and fillers to improve strength, formability, and appearance.

Here, the resin composition constituting the bio-degradable sheet may additionally include the processing aids. That is, since the bio-degradable resin such as polylactic acid generally has low impact resistance or thermal resistance, it is difficult to apply an existing processing method for a PVC-based sheet, such as a calendaring method, to the resin composition containing the bio-degradable resin. However, the flooring composition according to the present invention, which contains suitable processing aids in the resin composition, can solve such a problem.

The processing aids may include one or more of acrylic resin, urethane resin, thermoplastic polyolefin (TPO), or the like. Preferably, the processing aids may be one or more of these components, which are modified with a polar group, such as acid anhydride (for example, maleic anhydride) and/or epoxy, to contain the polar group, preferably, a grafted polar group, without being limited thereto. According to the invention, in terms of processability in calendaring processing, among the aforementioned processing aids, processing aids other than olefin-based agent are more preferably used. Specifically, acrylic processing aids may be used.

In the present invention, the kinds of respective resins to be used as the processing aids (for example, monomer composition, weight average molecular weight, etc.) and the kind and amount of acid anhydride or the like, which may be added to the resin, are not specifically limited. According to the present invention, the processing aids may be acrylic resin, urethane resin, or thermoplastic polyolefin resin, which contains 2 to 15 polar groups, preferably 4 to 10 polar groups per molecule. Acrylic resin may be more advantageously used. If the polar group contained in the processing aids is less than 2 groups, effects on improvement in melt strength may be deteriorated. If the polar group exceeds 16 groups, reaction of the polar groups occurs excessively and forms a polymer network, thereby providing a possibility of degrading sheet flatness.

In the resin composition, the processing aids may be present in an amount of 0.5 to 20 parts by weight, preferably 0.5 to 15 parts by weight, based on 100 parts by weight of the bio-degradable resin (for example, polylactic acid). If the amount of processing aids is too low, melt efficiency and improvement of melt strength are deteriorated, thereby making it difficult to apply, for example, a calendaring process thereto. If the amount of processing aids is too high, physical properties of a sheet can be deteriorated due to reduction in compatibility with other components.

However, it should be understood that the amount of processing aids described above is provided as an example. That is, according to the invention, the amount of processing aids may be properly varied in consideration of application, a processing method and conditions of the bio-degradable sheet.

According to the invention, the resin composition of the bio-degradable sheet may also contain a plasticizer. The plasticizer may serve to soften the resin composition, thereby improving processability, when a hard resin such as L-polylactic acid is used.

The kind of plasticizer is not specifically limited so long as the plasticizer can ensure the effects described above. Examples of the plasticizer may include phthalate-based compounds, allyl phosphate esters, dialkylether diester, tricarboxylic acid ester, epoxidized oil, epoxidized esters, polyalkylene oxides (for example, polyethylene oxide, polypropylene oxide, etc.), polyester, polyglycol diester, allylether diester, aliphatic diester, alkylether monoester, citrate ester, dicarboxylic acid ester, vegetable oil, glycerin ester, and combinations of two or more thereof. In addition, various kinds of plasticizers generally applied to fabrication of existing PVC-based sheets may also be used.

In one aspect of the present invention, the plasticizer may be epoxidized or other modified vegetable oil, such as epoxidized soya-bean oil, for example, epoxidized methyl soyate (MSO), epoxidized linseed oil (ELO), epoxidized soy oil (ESO), or epoxidized tall oil (ETO).

In the present invention, the plasticizer may be a citratic compound having environmentally friendly features, such as acetyl tributyl citrate (ATBC) or blends of citrate and modified vegetable oil.

According to the present invention, although any proper plasticizer selected from the compositions described above may be used according to use thereof, a non-toxic plasticizer, such as a citratic plasticizer (for example, ATBC) and/or vegetable oil, may be used in consideration of negative effects on human health (for example, user health). In addition, although it is desirable to exclude use of alcoholic plasticizers or low molecule weight oligomers to prevent reduction in compatibility with polylactic acid, acceleration of hydrolysis of the resin, and the like, the present invention is not limited thereto.

In the resin composition, the plasticizer may be present in an amount of 5 to 70 parts by weight, preferably 15 to 60 parts by weight, more preferably about 20 to 50 parts by weight, based on 100 parts by weight of the bio-degradable resin (for example, polylactic acid). If the amount of plasticizer is too low, hardness of the resin can excessively increase, thereby degrading processability, and if the amount of plasticizer is too high, physical properties of a sheet may be deteriorated due to a reduction in compatibility with other components.

However, it should be understood that the amount of plasticizer described above is provided as an example. That is, according to the present invention, the amount of plasticizer may be properly varied in consideration of application, processing method and conditions of the bio-degradable sheet.

According to the invention, the resin composition constituting the bio-degradable sheet may also contain fillers. The fillers may be added for improvement in strength and appearance, or for reduction of material cost.

The kind of fillers is not specifically limited, and may include inorganic fillers, such as calcium carbonate, talc, loess, silica, and alumina; organic fillers, such as wood fillers (for example, wood powder or wood chip), cork, kenaf, and pulp; and combinations thereof. The fillers may have high compatibility with resin and may exhibit high processability upon melting and high affinity with the plasticizer to allow the amount of plasticizer to set to a relatively high level by suppressing elution of the plasticizer. In terms of good appearance, organic fillers, particularly wood fillers, may be used, but the present invention is not limited thereto.

The amount of fillers contained in the resin composition may vary according to application of the bio-degradable sheet, and may be in the range of, for example, 1 to 300 parts by weight based on 100 parts by weight of the bio-degradable resin (for example, polylactic acid) in the resin composition. If the amount of fillers is too low, cost effects saving or strength improvement can be deteriorated, and if the amount of fillers is too high, adhesion to other components such as resin can be reduced, thereby causing processability such as calendaring processability to be deteriorated.

However, it should be understood that the amount of fillers described above is provided as an example. That is, according to the present invention, the amount of fillers may be properly varied in consideration of application, target strength and appearance, or cost-saving effect of the bio-degradable sheet.

In addition to the components described above, the resin composition may contain one or more kinds of additives generally used in fabrication of resin sheets, such as foaming agents (for example, oxybisbenzene sulfonyl hydrazide (OBSH), toluene sulfonyl hydrazide (TSH), azodicarbonamide (ADCA) and/or ZnO), lubricants, crosslinking agents, pigments, UV stabilizers, and the like.

According to this invention, proper crosslinking means may be used for crosslinking of the resin composition in order to improve sheet processability. For example, the crosslinking means may include a chemical-processing method, such as addition of peroxide (for example, dicumyl peroxide), and an electron ray crosslinking method using electron rays, without being limited thereto.

The flooring material according to the present invention includes the surface layer or rear surface layer having one or more bio-degradable sheets, which are composed of the resin composition described above, on the fiber layer or fiber-reinforced polymer layer.

In the present invention, the surface layer may include, for example, one or more layers selected from the group consisting of a transparent layer, a filler layer, and a printed layer. Here, the transparent layer or printed layer may be made of the bio-degradable sheet as described above.

In addition, the rear surface layer may include, for example, one or more layers selected from the group consisting of an interleaving layer, an elastic foaming layer, a release layer, an elastic layer, and a woven fabric layer. Here, the interleaving layer, the elastic foaming layer, the release layer, or the elastic layer may be made of the bio-degradable sheet as described above.

The flooring material of the present invention may be realized in a variety of forms through various combinations of one or more of the surface layer and/or the rear surface layer on the fiber layer or fiber-reinforced polymer layer.

FIG. 1 illustrates a flooring material 1 according to one exemplary embodiment of the invention, which includes an upper surface layer including a transparent layer 22 and a printed layer 21, and a lower rear surface layer including an interleaving layer 31, an elastic foaming layer 32 and a release layer 33, centered on a fiber-reinforced polymer layer 11.

As described above, one or more layers shown in FIG. 1, which constitute the surface layer or the rear surface layer, may be a bio-degradable sheet which is composed of a resin composition containing a bio-degradable resin. Preferably, all of the layers constituting the upper surface layer and the rear surface layer may be made of the bio-degradable sheet. When all of the layers constituting the surface layer and the rear surface layer are made of other components than the bio-degradable sheet, the other component is not limited to a specific one. For example, the component may be any existing component (for example, a PVC-based foaming layer) that is used for a flooring material in the related art.

For example, the woven fabric layer may include cotton, hemp, polyester woven fabric, jute, or nylon woven fabric. According to weaving manner, the woven fabric layer may be plain fabrics or twilled fabrics. In addition, the filler layer may have a variety of configurations known in the art.

For example, when the transparent layer 22 is composed of the bio-degradable sheet, the transparent layer may be fabricated by forming a resin composition containing 20 to 40 parts by weight of a plasticizer, 2 to 10 parts by weight of processing aids, and optionally 0.5 to 2 parts by weight of UV stabilizer, based on 100 parts by weight of the bio-degradable resin (or mixture of the bio-degradable resin and other resins).

In addition, when the printed layer 21 is formed of the bio-degradable sheet, it may be formed of a resin composition containing 0.5 to 20 parts by weight of processing aids, 20 to 50 parts by weight of a plasticizer, and 0 to 100 parts by weight of fillers, based on 100 parts by weight of the bio-degradable resin (or mixture of the bio-degradable resin and other resins). In this case, the resin composition may additionally contain 0.5 to 30 parts by weight of pigments such as white pigments (for example, titanium dioxide) in order to improve appearance and printability of the printed layer 21. According to the present invention, various patterns may be printed on the printed layer 21 by gravure printing, screen printing, offset printing, rotary printing, flexo-printing, or the like.

In addition, when the interleaving layer 31 or release layer 33 is formed of the bio-degradable sheet, the interleaving layer 31 may be formed of a resin composition containing 0.5 to 20 parts by weight of processing aids, 20 to 60 parts by weight of a plasticizer, and 5 to 100 parts by weight of filler, based on 100 parts by weight of the bio-degradable resin (or mixture of the bio-degradable resin and other resins).

In addition, when the elastic foaming layer 32 is formed of the bio-degradable sheet, it may be formed of a resin composition containing 0.5 to 20 parts by weight of processing aids, 25 to 45 parts by weight of a plasticizer, and 5 to 60 parts by weight of fillers (for example, calcium carbonate), based on 100 parts by weight of the bio-degradable resin (or mixture of the bio-degradable resin and other resins). In this case, the resin composition may contain an appropriate amount of foaming agent.

FIG. 2 shows a flooring material 2 according to another exemplary embodiment of the invention, which includes an upper surface layer including a transparent layer 22 and a printed layer 21, and a lower rear surface layer including an elastic layer 34, centered on a fiber-reinforced polymer layer 11.

In FIG. 2, when the transparent layer 22 or printed layer 21 is formed of the bio-degradable sheet, the detailed configuration is the same as described above.

In addition, when the elastic layer 34 is formed of the bio-degradable sheet, the elastic layer 34 may be formed of a resin composition containing 0.5 to 20 parts by weight of processing aids, 20 to 60 parts by weight of a plasticizer, and 5 to 100 parts by weight of fillers (for example, wood flour), based on 100 parts by weight of the bio-degradable resin (or mixture of the bio-degradable resin and other resins).

FIGS. 3 and 4 show flooring materials 3, 4 according to other exemplary embodiments of the present invention, wherein a surface-treated layer 41 is formed on top of the flooring material shown in FIGS. 1 and 2. FIG. 5 illustrates a flooring material in which a woven (fabric) layer 51 is additionally formed to the lowermost portion of the flooring material shown in FIG. 4.

In these embodiments, the surface-treated layer 41 may be formed to improve scratch resistance or wear resistance of the flooring material. In the present invention, a method of forming the surface-treated layer 41 is not specifically limited. For example, the surface-treated layer may be fabricated by applying UV-curable paints (for example, urethane acrylate-based UV-curable paints), which are generally used in the art, to the surface of the flooring material, followed by curing the same with UV radiation.

In addition, a method of forming the woven fabric layer 51 is not specifically limited. For example, the woven fabric layer may be formed by attaching a variety of woven fabrics as described above to the flooring material in a rolling manner, or otherwise via a sol or adhesives used in the art.

The present invention relates to a method of fabricating a flooring material, which includes: forming a fiber layer or fiber-reinforced polymer layer in a first operation, and forming a bio-degradable sheet on the fiber layer or fiber-reinforced polymer layer in a second operation.

The first operation is a process for preparing the fiber layer or fiber-reinforced polymer layer which serves as a size stabilizing layer in the flooring material according to the present invention.

In the first operation, the process for preparing the fiber layer is not specifically limited, and may be carried out by, for example, a conventional weaving process or paper-making process, as described above.

Further, in the first operation, the process for preparing the fiber-reinforced polymer layer is not specifically limited, and may be carried out by, for example, a method in which woven fabrics, nonwoven fabrics, or scrims fabricated by the weaving process or paper-making process, are impregnated with a resin composition.

Here, the resin composition used in impregnation may include a resin component that contains at least one selected from the group consisting of poly lactic acid (PLA), acrylic resin, polyvinyl chloride (PVC), urethane resin, melamine resin, phenol resin, epoxy resin, and polyester resin. In addition, the resin composition may be prepared in the form of a kneaded product that additionally contains 130 parts by weight or less, preferably 70 parts by weight of a plasticizer, and 130 parts by weight or less of fillers, based on 100 parts by weight of the resin component described above. In addition, the kneaded product may also contain additional components such as stabilizers, as needed.

Here, the kind of plasticizer or fillers contained in the resin composition is not specifically limited, and may be the same component as used in fabrication of the bio-degradable sheet described above.

In the present invention, the impregnation process using the kneaded product may be a typical method, such as casting and lip laminating, without being limited thereto. Here, any suitable impregnation process among these methods may be selected in consideration of physical properties of the kneaded product to be used.

In addition, conditions for preparing the fiber-reinforced polymer layer are not specifically limited, and may be properly selected in consideration of the composition or impregnation process of the kneaded product to be used.

For example, lip laminating may be advantageously used when the kneaded product contains polylactic acid or urethane resin. In this case, the kneaded product may be extruded at a certain temperature (for example, 150 to 250° C.) and is impregnated into fiber using, for example, a T-die. Here, the melt index of the kneaded product may be regulated to be 40 or more in order to secure efficient impregnation. In addition, when the kneaded product contains polylactic acid, the processing temperature may be regulated to be below 240° C. in order to prevent thermal decomposition of the resin, but is not limited thereto.

In addition, casting may be advantageous when the kneaded product contains acrylic resin or PVC. In this case, a woven fabric or nonwoven fabric is impregnated with the kneaded product using a roll coater or the like, in which the kneaded product is formed into a gel.

The second operation is a process for fabricating a bio-degradable sheet on the fiber layer or fiber-reinforced polymer layer formed in the first operation.

The process of fabricating the bio-degradable sheet is not specifically limited. For example, the process may include a calendaring process or an extrusion process using a resin composition containing the respective components described above. In this embodiment, the calendaring process may be used, but the present invention is not limited thereto.

For example, the bio-degradable sheet may be fabricated by mixing raw materials, heating and pressing the mixture under a proper condition to form the mixture into a kneaded product in a uniformly dispersed gel state through a kneading process, and forming the kneaded product into a final sheet (for example, through a calendaring process).

Here, the mixing and kneading processes may be performed with respect to, for example, liquid or powdery raw materials using a super mixer, a kneader, an extruder, a mixer, a 2 or 3-piece roller, or the like. Further, in this process, the mixing and kneading processes may be repeatedly performed through multiple stages for more efficient mixing by, for example, kneading the prepared raw materials at a certain temperature (for example, 80 to 170° C.) using a Banbury mixer or the like, and mixing the kneaded product through two stages at a certain temperature (for example, 120 to 170° C.) using a 2-piece roller.

The process of fabricating the bio-degradable sheet using the mixed raw materials is not specifically limited. For example, when fabricating the sheet using a calendaring process, the bio-degradable sheet may be formed using a reverse L-type 4-piece roller calendaring apparatus. Here, the processing conditions of the calendaring process may be properly selected according to the composition and the like of the resin composition to be used. For example, the processing temperature may be controlled in the range of 120 to 180° C., preferably 130 to 170° C. If the processing temperature is too low, the resin is insufficiently softened, thereby causing deterioration of formability, and if the processing temperature is too high, viscosity excessively decreases, thereby also causing deterioration of formability. Therefore, it is desirable that the processing temperature be controlled according to the compositions of the raw materials to be used.

In the second operation, the bio-degradable sheet is formed on the fiber layer or fiber-reinforced polymer layer formed in the first operation.

The second operation may include: for example, (1) pressing the bio-degradable sheet onto one side of the fiber layer or fiber-reinforced polymer layer; (2) printing a pattern on the surface of the bio-degradable sheet pressed onto the fiber layer or fiber-reinforced polymer layer; and (3) additionally forming a bio-degradable sheet on one side or both sides of a laminate of the fiber layer or fiber-reinforced polymer layer having the pattern on the surface thereof and the bio-degradable sheet.

In this process, a printed layer composed of a size stabilizing layer and a bio-degradable sheet is first attached to prepare a laminate (hereinafter also referred to as a "printed layer-impregnated size stabilizing layer"), and then a surface layer or rear surface layer composed of a bio-degradable sheet is formed on one or both sides of the printed layer-impregnated size stabilizing layer.

In operation (1), the method of attaching the bio-degradable sheet (the printed layer) to the size stabilizing layer is not specifically limited, and may include, for example, a thermal bonding method which is performed under certain conditions.

In operation (2), the method of forming a decorative layer by printing a pattern is not specifically limited, and may include a variety of known printing methods, such as gravure printing, screen printing, offset printing, rotary printing, flexo-printing, and the like.

In operation (3), the bio-degradable sheet is additionally formed on one or both sides of the laminate (the printed layer-impregnated size stabilizing layer).

Here, the bio-degradable sheet formed on the printed layer-impregnated size stabilizing layer may be a unitary layer such as a transparent layer or an elastic layer, or otherwise may be a laminate consisting of two or more layers selected from the group consisting of an interleaving layer, an elastic foaming layer, and a release layer. Here, the method of forming the laminate is not specifically limited, and may performed by, for example, thermally pressing the respective layers constituting the laminate under proper conditions.

In addition, the bio-degradable sheet used in operation (2) or (3) may be previously subjected to heat treatment at an appropriate temperature (for example, at about 100 to 150° C.) before the thermal-bonding process, and in some cases, may be a foam that is prepared by a foaming process.

Here, the foaming process may be performed by, for example, preparing a proper amount of the aforementioned foaming agent in the sheet and passing the sheet through an oven. Here, the foaming condition in the oven is selected according to a desired foaming degree, and is not specifically limited. For example, the foaming process may be performed at a temperature of 100 to 180° C. and a rate of 4 to 25 m/min for about 1 to 3 minutes.

According to the present invention, the fabricated flooring material may be subjected to an embossing process through an embossing roller and the like. Alternatively, an embossing pattern may be formed on a target location of the flooring material using an embossing roller during the thermal-pressing process.

In the present invention, an additional process may be performed to stack a woven (fabric) layer on the lowermost layer of the laminate. The stacking method is not specifically limited, and may include, for example, hot-rolling or lamination using a sol or adhesives.

In the present invention, an additional process may be performed to form a surface-treated layer on the laminate.

Here, the method of forming the surface-treated layer is not specifically limited, and may be performed by, for example, cooling the fabricated laminate under certain conditions, applying UV-curable paints thereto, and exposing the resultant to UV radiation to cure the same.

EXAMPLE

Next, the present invention will be described in detail with reference to examples. It should be understood that the scope of the present invention is not limited by the following examples.

Example 1

Preparation of Size Stabilizing Layer (Fiber-Reinforced Polymer Layer)

An acrylic sol was prepared by mixing 100 parts by weight of an acrylic resin, 120 parts by weight of diisononyl phthalate (DINP), and 5 parts by weight of titanium dioxide. Then, nonwoven fabrics made of glass fiber (basis weight: 60 g/m$^2$) were impregnated with the acrylic sol using a roll coater, followed by drying at 140° C. for 3 minutes, thereby forming a size stabilizing layer.

Preparation of Bio-Degradable Sheet (1) Preparation of Printed Layer

A printed layer was prepared using a resin composition containing 100 parts by weight of polylactic acid (PLA), 30 parts by weight of acetyl tributyl citrate (ATBC), 5 parts by weight of a processing aid, and 10 parts by weight of titanium dioxide. Here, the polylactic acid was 2002D (melt index: less than 3) made by Nature Works, Inc., and the processing aid was an acrylic resin grafted with maleic anhydride. In the following examples, the types of polylactic acid and processing aid were the same as in this example. Specifically, the respective components were primarily kneaded using an extruder, secondarily kneaded using a Banbury mixer at 140° C., and finally mixed through two stages using a 2-piece roller at 140° C. Then, the resultant was subjected to a calendaring process at 130° C., thereby preparing a 0.3 mm thick sheet.

(2) Preparation of Interleaving Layer

A 0.3 mm thick interleaving layer was prepared by the same method as in preparation of the printed layer, except that the interleaving layer was prepared using a resin composition containing 100 parts by weight of polylactic acid (PLA), 40 parts by weight of acetyl tributyl citrate (ATBC), 5 parts by weight of the processing aid, and 10 parts by weight of wood flour.

(3) Preparation of Elastic Foaming Layer

An elastic foaming layer was prepared using a resin composition containing 100 parts by weight of the polylactic acid (PLA), 35 parts by weight of acetyl tributyl citrate (ATBC), 10 parts by weight of calcium carbonate, 12 parts by weight of oxybisbenzene sulfonyl hidrazide (OBSH), and 10 parts by weight of the processing aid.

Specifically, the respective components were primarily kneaded using an extruder, secondarily kneaded at a temperature of 130° C., and finally mixed through two stages using a 2-piece roller at 140° C. Then, the resultant was subjected to a calendaring process, thereby preparing an about 1 mm thick sheet.

(4) Preparation of Transparent Layer

A 0.5 mm thick transparent layer was prepared by the same method as in fabrication of the printed layer, except that the transparent layer was prepared using a resin composition containing 100 parts by weight of polylactic acid (PLA), 30 parts by weight of acetyl tributyl citrate (ATBC), and 5 parts by weight of the processing aid.

Fabrication of Flooring Material

The printed layer was thermally laminated on the size stabilizing layer at 150° C., and subjected to gravure printing to print a pattern thereon, thereby preparing a printed layer-impregnated size stabilizing layer. The interleaving layer and the elastic foaming layer were pre-heated through a heating drum at 140° C., and were thermally bonded together an embossing roller, thereby fabricating a laminate. Then, the laminate was passed through a foaming oven at a temperature of 165 and a rate of 8 m/min for about 150 seconds (foaming magnification: about 200%). Subsequently, the printed layer-impregnated size stabilizing layer and the transparent layer were pressed and pre-heated through a heating drum at 160° C., and were thermally bonded to each other together with the foamed product through an embossing roller, thereby forming an about 3 mm thick laminate. Subsequently, a urethane acrylate-based UV-curable paint was applied to the surface of the transparent layer of the laminate, and the resultant was exposed to UV irradiation to form a surface-treated layer, thereby fabricating a flooring material.

Example 2

A flooring material was fabricated using the same method as in Example 1, except that an elastic layer was applied, instead of the interleaving layer and the elastic foaming layer, which were used as the rear surface layer in Example 1. Here, the elastic layer was prepared by primarily kneading 100 parts by weight of polylactic acid (PLA), 40 parts by weight of acetyl tributyl citrate (ATBC), 10 parts by weight of wood flour and 5 parts by weight of the processing aid using an extruder, followed by kneading using a Banbury mixer at 140° C., and the resultant was mixed through two stages using a 2-piece roller at 140° C. Subsequently, the resultant was subjected to a calendaring process, thereby fabricating an about 1 mm thick sheet.

Example 3

A flooring material was fabricated using the same method as in Example 2, except that a jute fabric having a thickness of about 1 mm was attached to the lowermost layer of the flooring material.

| [Brief Description of Reference Numerals] | |
|---|---|
| 1, 2, 3, 4, 5: Flooring Material | |
| 11: Size stabilizing layer | 21: Printed Layer |
| 22: Transparent Layer | 31: Interleaving layer |
| 32: Elastic Foaming Layer | 33: Release layer |
| 34: Elastic Layer | 41: Surface-Treated Layer |
| 51: Woven Fabric Layer | |

The invention claimed is:

1. A flooring material comprising: a fiber layer or a fiber-reinforced polymer layer; and a front surface layer or a rear surface layer formed on the fiber layer or fiber reinforced layer and the front surface layer or the rear surface layer comprising at least one bio-degradable sheet;
   wherein the bio-degradable sheet is formed of a resin composition comprising polylactic acid;
   wherein the resin composition further comprises at least one processing aid, wherein the processing aid is a urethane resin modified by at least 2 to 15 polar groups;
   wherein the fiber layer or fiber-reinforced polymer layer has a thickness of 0.2 to 0.8 mm; and
   wherein the processing aids are present in an amount of 0.5 to 20 parts by weight based on 100 parts by weight of the polylactic acid.

2. The flooring material of claim 1, wherein the fiber layer includes woven fabric, nonwoven fabric, or scrim comprising at least one component selected from the group consisting of glass fiber, carbon fiber, polyester fiber, polyamide fiber, polyurethane fiber, acrylic fiber, polyolefin fiber, and cellulose fiber.

3. The flooring material of claim 1, wherein the fiber-reinforced polymer layer comprises woven fabric, nonwoven fabric or scrim comprising at least one component selected from the group consisting of poly lactic acid, acrylic resin, polyvinyl chloride, urethane resin, melamine resin, phenol resin, epoxy resin, and polyester resin.

4. The flooring material of claim 3, wherein the woven fabric, nonwoven fabric or scrim has a basis weight of 20 to 120 g/m$^2$.

5. The flooring material of claim 1, wherein the polylactic acid comprises L-polylactic acid.

6. The flooring material of claim 1, wherein the resin composition further comprises plasticizers and fillers.

7. The flooring material of claim 6, wherein the plasticizers comprise at least one component selected from the group consisting of a phthalate-based compound, allyl phosphate ester, dialkylether diester, tricarboxylic acid ester, epoxidized oil, epoxidized ester, polyalkylene oxide, polyester, polyglycol diester, allylether diester, aliphatic diester, alkylether monoester, citrate ester, dicarboxylic acid ester, vegetable oil, and glycerin ester.

8. The flooring material of claim 6, wherein the plasticizers are present in an amount of 20 to 50 parts by weight based on 100 parts by weight of the polylactic acid.

9. The flooring material of claim 6, wherein the fillers comprise organic fillers or inorganic fillers.

10. The flooring material of claim 6, wherein the fillers are present in an amount of 1 to 300 parts by weight based on 100 parts by weight of the polylactic acid.

11. The flooring material of claim 1, wherein the resin composition further comprises at least one component selected from the group consisting of foaming agents, lubricants, crosslinking agents, and UV stabilizers.

12. The flooring material of claim 1, wherein the front surface layer comprises at least one component selected from the group consisting of a transparent layer, a filler layer, and a printed layer.

13. The flooring material of claim 1, wherein the rear surface layer comprises at least one component selected from the group consisting of an interleaving layer, an elastic foaming layer, a release layer, an elastic layer, and a woven fabric layer.

14. A flooring material comprising: a fiber-reinforced polymer layer; and a front surface layer or a rear surface layer formed on the fiber reinforced layer and the front surface layer or the rear surface layer comprising at least one bio-degradable sheet;

wherein the bio-degradable sheet is formed of a resin composition comprising polylactic acid;

wherein the resin composition further comprises processing aids; and wherein the processing aids comprise at least one selected from the group consisting of acrylic resin and urethane resin; and wherein the fiber-reinforced polymer layer has a thickness of 0.2 to 0.8 mm;

wherein the processing aids are present in an amount of 0.5 to 20 parts by weight based on 100 parts by weight of the polylactic acid, wherein the fiber-reinforced polymer layer is a composite layer which is formed by impregnating a nonwoven fabric of glass fiber with a resin, wherein the resin is a urethane resin, wherein the glass fiber has a basis weight of 20 to 120 g/m2.

15. The flooring material of claim 14, wherein the polylactic acid in the resin composition for the bio-degradable sheet is a copolymer having comonomer selected from the group consisting of a glycol compound, dicarboxylic acid, hydroxycarbonic acid and lactones.

16. The flooring material of claim 14, wherein the resin composition further includes poly(butyleneadipate-co-terephthalate) (PBAT).

17. A method of fabricating a flooring material, comprising:

forming a fiber layer or a fiber-reinforced polymer layer; and forming a bio-degradable sheet on the fiber layer or fiber-reinforced polymer layer;

wherein the bio-degradable sheet is formed of a resin composition comprising polylactic acid;

wherein the resin composition further comprises at least one processing aid, wherein the processing aid is a urethane resin modified by at least 2 to 15 polar groups;

wherein the fiber layer or fiber-reinforced polymer layer has a thickness of 0.2 to 0.8 mm;

wherein the processing aids are present in an amount of 0.5 to 20 parts by weight based on 100 parts by weight of the polylactic acid; and wherein the bio-degradable sheet is formed by a calendaring process.

18. The method of claim 17, wherein the formation of the bio-degradable sheet comprises: (1) pressing the bio-degradable sheet onto one side of the fiber layer or fiber-reinforced polymer layer; (2) printing a pattern on a surface of the bio-degradable sheet pressed onto the fiber layer or fiber-reinforced polymer layer; and (3) additionally forming a bio-degradable sheet on one side or both sides of a laminate of the fiber layer or fiber-reinforced polymer layer having the pattern on the surface thereof and the bio-degradable sheet.

* * * * *